United States Patent [19] [11] 3,855,938
Peveraro [45] Dec. 24, 1974

[54] SWITCHES OR POINTS FOR TRACKS FOR VEHICLES
[75] Inventor: Cesare Peveraro, Milano, Italy
[73] Assignee: Societa' Per La Strada Guidata S.R.L., Milano, Italy
[22] Filed: Oct. 1, 1973
[21] Appl. No.: 402,390

[52] U.S. Cl. .................................. 104/130, 104/96
[51] Int. Cl. ........................................... E01b 25/08
[58] Field of Search ............ 104/96, 100, 101, 103, 104/104, 105, 130, 242, 243, 244.1, 245, 246, 247; 105/215 R

[56] References Cited
UNITED STATES PATENTS
3,098,454   7/1963   Maestrelli ..................... 104/244.1
3,710,727   1/1973   Svensson .......................... 104/130
3,785,294   1/1974   Omar ................................ 104/130

Primary Examiner—M. Henson Wood, Jr.
Assistant Examiner—D. W. Keen
Attorney, Agent, or Firm—Hopgood, Calimafde, Kalil, Blaustein & Lieberman

[57] ABSTRACT

This invention relates to switches for track for vehicles having horizontal drive wheels for cooperation with opposing surfaces of the track to guide the vehicles. The switches have three elements, two fixed and one movable, which serve to guide vehicles along one route or another according to the position of the movable element. The vehicles have guide rollers which cooperate with the drive wheels, with one of the elements therebetween, and enable the vehicle to traverse the switch when drive wheels on one side of the vehicle are out of contact with a surface of the track or the switch. Switches in accordance with the invention can be banked to enable increased speeds to be obtained whilst negotiating small radius curvature bends through the switch.

3 Claims, 1 Drawing Figure

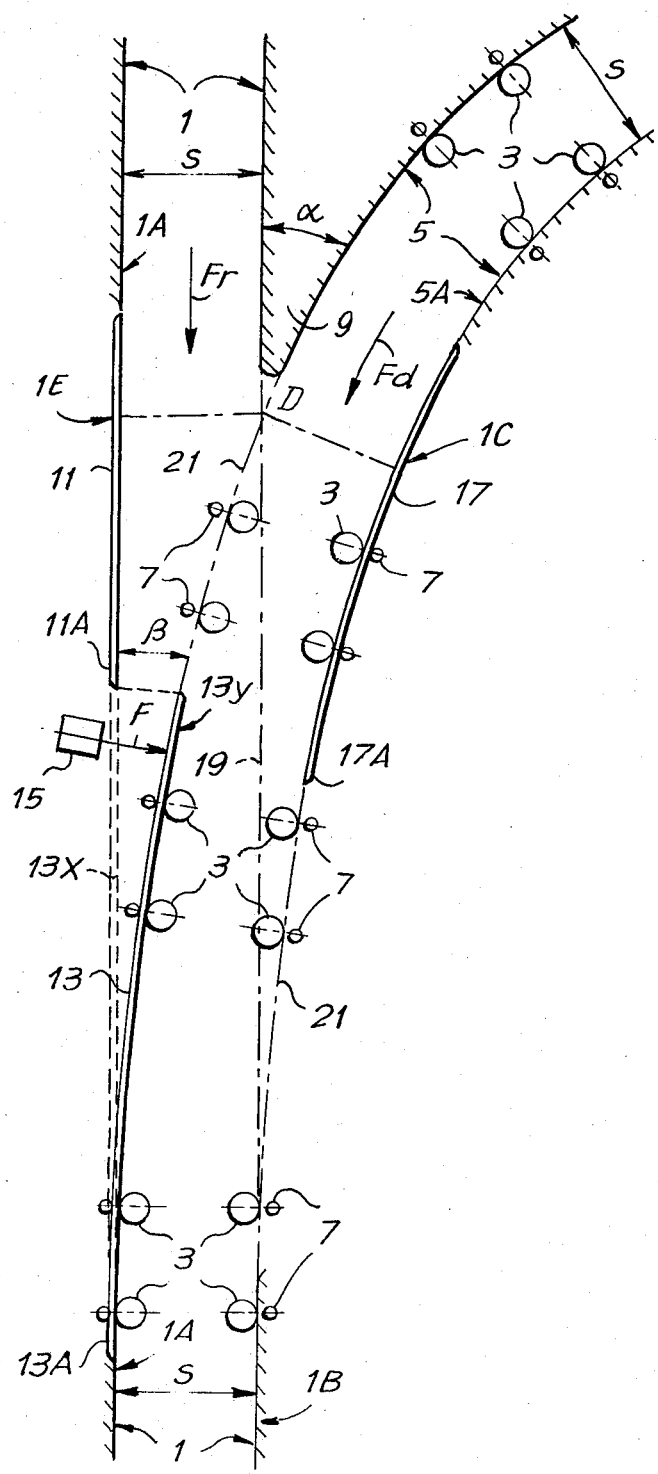

3,855,938

SWITCHES OR POINTS FOR TRACKS FOR VEHICLES

This invention relates to switches or points for tracks for vehicles, for example vehicles having wheels with tyres guided by the track.

According to the present invention there is provided a switch or points for track for a vehicle having horizontal drive wheels for cooperation with opposing surfaces of the track to guide the vehicle, and guide rollers for external surfaces on the track for allowing the vehicle to be driven on only one side, the switch or points adjacent a straight portion opposite a deviation having a first guide with an inwardly facing surface and an outwardly facing surface, said guide being fixed near the crossing zone of the switch or points, and a movable resilient tongue fixed by one end remote from the switch zone and arranged to be deformed to provide a deviation; and in correspondence and on the side opposite the crossing, a fixed guide with an inwardly facing surface and an outwardly facing surface, the fixed guide extending parallel to one end of the resilient tongue when the tongue is deviated, the tongue and guide cooperating to provide an overlap region for facilitating travel of a vehicle onto or off the vehicle being guided first on one side and then on the other.

The invention further provides a switch or points for a track for a vehicle guided by wheels rotatable in a substantially horizontal plane and arranged to cooperate with inwardly facing, substantially vertical surfaces of the track, the switch or points being arranged to allow a vehicle to travel along a first track or from the first track onto a second track and having a first guide element adjacent and on either side respectively of the switching or frog of the switch or points, said first and second elements each providing a substantially vertical, inwardly facing surface for guiding the wheels of the vehicle and a substantially vertical, outwardly facing surface for cooperation with guide rollers on the vehicle whereby the vehicle can be guided by one or other of said elements through the switch or points, the switch or points having a further, deformable guide element with inwardly and outwardly facing substantially vertical surfaces whereby a vehicle can be guided by said wheels and rollers from the deformable element on to the first or second element according to the deformation of the deformable element.

One embodiment of the invention will now be described, by way of example, with reference to the accompanying diagrammatic drawing, the sole FIGURE of which shows a plan view of the embodiment.

In the drawing, opposing surfaces or sides 1 of a straight portion of track are provided, against which wheels 3 are rotatable in a horizontal plane. The wheels 3 have tyres and are on the guide carriage of a wheeled vehicle (not shown). The vehicle is thereby guided in the track. Opposing surfaces or sides of a branch track are indicated at 5, which deviates from the straight track through the switch or points in accordance with the invention. Guide means forming the tracks include not only surfaces 1 and 5 or the like but also further surfaces on which external guide rollers can cooperate to form a part of a single guide or drive unit which includes a horizontal wheel 3. Rollers 7 are arranged to act on these further surfaces, at a different level from the wheels 3, where the vehicles are guided on only one side rather than both sides. Such a guide or drive arrangement has been hitherto proposed and it is now known as the "S.S.G. system". The rollers 7 are outward of wheels 3 relative to the vehicle on the track, and advantageously the wheels 3 are spaced according to the gap between the surfaces 1, by the distance S in the drawing.

Between surfaces 1 and 5 is a peak or so-called crossing or frog 9 defining an angle $\alpha$. The angle $\alpha$ varies according to the radius of curvature of the track defined by surfaces 5.

The surfaces 1 do not extend over the region of the switch or points. Drive structures for drive units of the vehicle can be as follows. Substantially in correspondence with the crossing 9, on the side opposite the deviation and thus on the external side, is a guide structure 11 defining an inwardly directed surface and an outwardly directed surface relative to the track. Structure 11 is in line with a surface 1A of the track 1, and it ends, so as to join up with the free end of a resilient tongue 13 which is also in line with the surface 1A. The tongue 13 is fixed in zone 13A so that it follows the surface 1A of the track 1, and assumes a reset position 13X where it is aligned with surface 1A and structure 11. Tongue 13 can be elastically deformed to the position shown in full line in the drawing to follow the deviated track 5. Deformation of the tongue 13 can be effected by device 15 acting in the direction of arrow F, substantially normal to the tongue 13, and at a short distance from the free end of the tongue. When the tongue 13 has been deviated, it assumes a generally parabolic shape, except at its free end portion which remains straight and forms a tangent to the curve assumed by the rest of the tongue, as also does the portion in the zone 13A, relative to the surface 1A. The tongue 13 forms two guide surfaces for wheels 3 and outer rollers 7 of the drive for the vehicle.

Along surface 5A of the track 5 is a fixed guide structure 17 having two opposing surfaces. Structure 17 extends from the vicinity of crossing 9 towards the straight track defined by the surfaces 1.

The structure 17 ends at 17A which is at a distance from the straight track sufficient to enable rollers 7 of a vehicle to travel along the straight track to clear end 17A. The movable, free end of tongue 13, when resiliently deformed, is moved away from end 11A of the structure 11 by an extent sufficient to allow transfer of rollers 7 of drive units either onto or off tongue 13, as they are guided therealong. Deformation of tongue 13 defines an angle $\beta$ between the structure 11 and the tangent to the deviated end of the tongue 13. Angle $\beta$ is smaller than angle $\alpha$. Movement of tongue 13, defined by angle $\beta$ is proportionally smaller than that defined by angle $\alpha$, as the latter increases, since the difference between the angles $\alpha$ and $\beta$ increases with increases in the angle $\alpha$.

A vehicle arriving as indicated by arrow $F_r$ is guided first by two surfaces 1. Then, as the traversal begins, it is guided on its right-hand side by the structure 11, and subsequently by the tongue 13. Tongue 13 is then in position 13X. Thereafter, the vehicle is guided by the inwardly directed surfaces 1 of the straight track from approximately the position of zone 13A. Chain line 19 indicates the approximate external trajectory of the wheels 3 of a vehicle as it traverses the crossing.

A vehicle in transit in a direction opposite to that of the arrow $F_r$ is guided in a corresponding manner to that described above.

A vehicle arriving from track 5 in the direction of arrow $F_d$ begins to be guided on its left-hand side by structure 17 through wheels 3 and rollers 7. Before reaching end 17A of the structure 17, the drive unit of such a vehicle also begins to be guided by the tongue 13 which has been resiliently deformed and locked in the position shown in the drawing in full line. After having passed through an over-lap zone (defined by end 17A of structure 17 and by the substantially straight end portion of the deformed tongue 13) the vehicle begins to be guided only on its right-hand side with respect to the direction of motion indicated by the arrow $F_d$, until it reaches and engages surface 1A adjacent zone 13A. A vehicle in transit in the direction opposite to arrow $F_d$ is guided in a corresponding manner that just described. The broken line 21 indicates the trajectory of the outer extent of the wheels 3 of a vehicle that travels along the deviated track defined by the surfaces 5.

The profile of the deviated track, and in particular the profile of the structure 17, may have an increasing radius of curvature with distance from line 19, for example it can be substantially parabolic.

It is possible for the deviated track opposite surface 1A to have a transversely increasing inclination between the zone 13A and the crossing zone, that is the region of structure 17 and the surface 5A. This facilitates easy sliding of a vehicle on the deviated track having a radius of curvature which is considerably less between the zone 13A and structure 17, than between the adjacent bank 5A.

One disadvantage of hitherto proposed railway switches or points is that the track which deviates in a curve is in the same plane as the straight track. As a result, there is no raised portion in the curve and this imposes a restriction on the transit speed of vehicles negotiating the switch. Where possible, this can in part be compensated by reducing the angle $\alpha$, with a consequent extension of the length of the switch and an increase in the radius of curvature of the deviated portion. However, it is not always possible, for example underground, to reduce the angle $\alpha$. It is then preferable to have a raised portion in the deviated section of a curve, and it is then preferred to have the switch in the curve.

The raised portion will depart from a small superelevation ($h$) in correspondence of the section 1A–1B.

Suppose for simplicity of description that the curved portion 1B–1C–5A is all at the same level. At crossing D-1C, is a raised portion H which is higher than $h$.

The surfaces of the track defining the switch or frog zone are independent of one another, and each on its own can guide a vehicle. In particular, surfaces 1B–1C–5A are independent of surfaces 13A–11 and also of surfaces 13A–13Y of the tongue 13.

The element which connects the various surfaces is that the trajectory of the wheels of a vehicle (line 19 in the drawing) rises between 1B and D by H. This can readily be achieved. Furthermore, curve 1A–D rises by (H–$h$). Consequently the straight track 13A–1E will be inclined at an angle with respect to track 1B–D, and will rise by (H–$h$). This inclination of the track may be cancelled out if 1A and 1B are at the same level, because the portion of track 13A–1E will then rise by $h$, provided points D and 1E are at the same level.

It is apparent that line 1A–1E is inclined with respect to line 1B–D and the inclination depends upon the values of $h$ and H. It will be more or less inclined according to the adjustment of pneumatic springs of the vehicle. This will allow large and small differences in level to be used. The longer the portion 1B–D, the easier it will be to provide a particular elevation (H–$h$).

Beyond sections (1C–D), (1A–1B) and (1E–D), the track is free to be in any plane.

The hereinbefore specifically described embodiment of switch or points can be constructed to be smaller and simpler than hitherto proposed switches or points. This can provide comparatively low construction and running costs, and enable the track to have a transverse inclination in the curved portion of the switch or points. Furthermore, the operational simplicity can provide safe operation even though this switch is not of the trailing type.

I claim:

1. A switch for track for a vehicle having horizontal drive wheels for cooperation with opposing surfaces of the track to guide the vehicle and guide rollers for external surfaces on the track for allowing the vehicle to be driven on only one side, the switch adjacent a straight portion opposite a deviation having a first guide with an inwardly-facing surface and an outwardly-facing surface, said guide being fixed near the crossing zone of the switch and a movable resilient tongue fixed by one end remote from the switch zone and arranged to be deformed to provide a deviation; and a second, fixed, guide with an inwardly-facing surface and an outwardly-facing surface, in correspondence and on the side opposite the crossing, the second guide extending parallel to one end portion of the resilient tongue when the tongue is deviated, the tongue and second guide co-operating to provide an overlap region for facilitating travel of a vehicle onto or off the deviated track, the vehicle being guided first on one side and then on the other.

2. A switch as claimed in claim 1, wherein the second fixed, guide terminates at a distance from the straight track sufficient to allow outer said guide rollers of a vehicle to clear the guide when the vehicle is running along the straight track.

3. A switch for a track for a vehicle the vehicle having wheels rotatable in a substantially horizontal plane and arranged to cooperate with inwardly-facing, substantially vertical surfaces of the track and guide rollers for co-operation with said wheels as the vehicle traverses the switch, the switch being arranged to allow a vehicle to travel over one of two routes, the first route along a first track and the second route from the first track onto a second track, the switch having a first guide element, a second guide element adjacent and on either side respectively of the frog of the switch, said first and second elements each having a substantially vertical, inwardly-facing surface for guiding the wheels of the vehicle and a substantially vertical, outwardly-facing surface for co-operation with guide rollers on the vehicle whereby the vehicle can be guided by one or other of said elements through the switch, and a further, deformable guide element with inwardly- and outwardly-facing substantially vertical surfaces whereby a vehicle can be guided by said wheels and rollers from the deformable element onto the first or second element according to the deformation of the deformable element.

* * * * *